(12) United States Patent
Minin et al.

(10) Patent No.: US 8,600,146 B2
(45) Date of Patent: Dec. 3, 2013

(54) METHOD FOR THE CLASSIFICATION OF BANKNOTES

(75) Inventors: Petr Valer'evich Minin, Moscow (RU); Vladislav Igorevich Korotenko, Moscow (RU); Dmitry Evgen'evich Sheshukov, Moscow (RU)

(73) Assignee: Obshhestvo S Ogranichennoj Otvetstvennost'Ju "Konstruktorskoe Bjuro "Dors" (OOO "KB "Dors"), Moscow (RU)

( * ) Notice: Subject to any disclaimer, the term of this patent is extended or adjusted under 35 U.S.C. 154(b) by 0 days.

(21) Appl. No.: 13/639,851

(22) PCT Filed: Apr. 7, 2011

(86) PCT No.: PCT/RU2011/000232
§ 371 (c)(1),
(2), (4) Date: Oct. 5, 2012

(87) PCT Pub. No.: WO2011/126410
PCT Pub. Date: Oct. 13, 2011

(65) Prior Publication Data
US 2013/0034291 A1    Feb. 7, 2013

(30) Foreign Application Priority Data

Apr. 8, 2010 (RU) ................................. 2010113710

(51) Int. Cl.
*G06K 9/00* (2006.01)
*G06K 9/62* (2006.01)
(52) U.S. Cl.
USPC ............................ 382/137; 382/119; 382/224

(58) Field of Classification Search
USPC .................................. 382/173, 190, 224, 312
See application file for complete search history.

(56) References Cited

U.S. PATENT DOCUMENTS

| | | | | |
|---|---|---|---|---|
| 4,662,621 A * | 5/1987 | Lundblad | ...................... | 271/3.19 |
| 5,678,677 A * | 10/1997 | Baudat | ........................... | 194/206 |
| 6,621,919 B2 * | 9/2003 | Mennie et al. | ................ | 382/135 |
| 6,721,442 B1 * | 4/2004 | Mennie et al. | ................ | 382/135 |
| 7,212,948 B2 * | 5/2007 | Voser | ............................ | 702/182 |

(Continued)

FOREIGN PATENT DOCUMENTS

| | | |
|---|---|---|
| EP | 0 874 333 A1 | 10/1998 |
| RU | 2 183 350 C2 | 6/2002 |
| WO | WO 95/23388 A1 | 8/1995 |
| WO | WO 2007/068867 | 6/2007 |

OTHER PUBLICATIONS

International Search Report with English translation, mailing date Aug. 18, 2011, for corresponding International Application No. PCT/RU2011/000232.

*Primary Examiner* — Kanjibhai Patel
(74) *Attorney, Agent, or Firm* — Intellectual Property Law Group LLP

(57) ABSTRACT

The invention group relates to the banknote detecting means. The technical result is increase in the banknote identification accuracy. The method is based on a computational processing of the banknote scan formed in the device during scanning. The banknote digital image is separated into areas; for each area a function is calculated and a feature vector is composed with further calculation of the distance to the known classes represented by the parameters available beforehand. Moreover, the calculated function of the banknote digital image allows calculation of its signature in a form of binary number that is compared with the classes known beforehand.

24 Claims, 12 Drawing Sheets

(56) References Cited

U.S. PATENT DOCUMENTS

| | | | |
|---|---|---|---|
| 7,430,310 B2* | 9/2008 | Kotovich et al. | 382/137 |
| 7,631,743 B2* | 12/2009 | Takai et al. | 194/206 |
| 7,715,613 B2* | 5/2010 | Dobbs et al. | 382/135 |
| 7,912,272 B2* | 3/2011 | Joshi et al. | 382/137 |
| 8,417,016 B2* | 4/2013 | Bell et al. | 382/135 |
| 2006/0106717 A1* | 5/2006 | Randle et al. | 705/45 |
| 2008/0164689 A1* | 7/2008 | Jordan et al. | 283/74 |
| 2009/0324053 A1* | 12/2009 | Ross et al. | 382/137 |

* cited by examiner

METHOD FOR THE CLASSIFICATION OF BANKNOTES

CROSS-REFERENCE TO RELATED APPLICATIONS

This application is a U.S. National Phase application, under 35 U.S.C. §371, of International Application no. PCT/RU2011/000232, with an international filing date of Apr. 7, 2011, and claims benefit of Russian Application no. 2010113710 filed on Apr. 8, 2010, and which are hereby incorporated by reference for all purposes.

FIELD OF THE INVENTION

The invention concerns the methods to determine the banknote main characteristics: the currency type and its denomination. The method may be used in the devices for the banknote detecting, counting or sorting.

The method under description is based on a computational processing of the digital scan of banknote formed in the device during scanning a banknote transported through the device and oriented in a random way. Computational processing of the digital scan (called classification) results in determination of one or more classes the banknote may belong to. The banknote class is a unique collection of the banknote currency, denomination and orientation. A counterfeit banknote and the other documents for processing which the method is not adjusted to are considered not to belong to any class.

If classification results in several possible classes, it is necessary to clarify the class the banknote really belongs to. Basing on determined banknote class the device takes a decision about further transfer of the banknote and supplying the user with information about that banknote in compliance with the device adjustments and its operation algorithm. Even if classification does not give a full solution to the problem of an exact assignment of the banknote to some class, it makes possible a significant speeding up of banknote processing as it excludes the majority of classes from consideration at the final stage of additional determination.

BACKGROUND OF THE INVENTION

The classification method the device uses for processing banknotes is described in international application WO 2007/068867 (published on Jun. 21, 2007, IPC G07D7/20). The device scans a banknote and obtains its digital scan consisting of the banknote two-dimensional images. The device is equipped with a computing unit for a computational processing of the digital scan.

In compliance with the above-mentioned method, an automatic validation uses a set of classifiers of the same class; each classifier is applied to a set of average values of the individual areas of the image. The image areas to be averaged are defined according to partitioning scheme specified individually for each classifier. The classifier of one class is a computational process whose result is an estimating statistical characteristic. Each known class has a criterion of banknote membership in a specific class; the criterion is based on making comparison of the value of the estimating statistical value for the given class with a predefined threshold value. In compliance with this method, classifiers for all known classes are successively applied to the banknote scan, and only then their results are analyzed, and a conclusion is drawn that the banknote belongs to some class.

One of the drawbacks of the method described in the above-mentioned application is an individual area partitioning scheme used for each classifier. It means that average values for the areas shall be calculated separately for each classifier. Another shortcoming of the given method is that the main computational processing (calculation of average values and calculation of classifiers) for each possible class is carried out in the same volume, and only then the result is analyzed. Both imperfections result in a serious computational complexity, especially when the number of classifiers in use is large. Serious computational complexity in turn demands a high performance computing unit.

This method is characterized by a practically linear increase in the performance requirements for the device computing unit if the number of classes the banknote may belong to rises. It is due to an independent checking of the banknote correspondence to each possible class. So, it is extremely difficult for implementation of the known method to develop a device that may work with a considerable number of currencies of various countries.

SUMMARY OF INVENTION

The goal of the given invention is development of the method for classification of banknotes belonging to a considerable number of possible classes when a computing unit with a middle performance level is used.

The technical result is increase in the banknote identification accuracy.

This result is achieved due to the banknote classification method in compliance with variant 1 when a banknote is scanned for obtaining its two-dimensional image consisting of pixels, and the above-mentioned image is separated into areas in compliance with the specified partitioning scheme; the function for each area is computed with a definite algorithm in such a way that its value depends on the values of the pixels within the area; the calculated values are used to compose a banknote feature vector by using the function values calculated for each area as coordinates in the feature space, and a conclusion is drawn about the banknote possible membership in (at least) one banknote class known beforehand. To draw the above-mentioned conclusion, there is determined the distance between the banknote and the class in the feature space. The class is represented by a class centroid vector known beforehand, by an allowable deviation vector known beforehand, and by the maximum allowable distance to the class. To compute the distance between the banknote and the class known beforehand, for each separate coordinate in the feature space the module of difference is found between the value of this coordinate of the banknote feature vector and that of the centroid vector, then the value of the allowable deviation vector for the given coordinate is subtracted from the above-mentioned module. The distance is calculated by summing only positive obtained values. To draw a conclusion, the distance between the banknote and the given class is compared with the maximum allowable distance to the given class. If the resulting distance does not exceed the maximum allowable distance to the given class, a conclusion is drawn about a possible membership of the banknote in the given class, but if the distance found exceeds the maximum allowable distance to the given class, a conclusion is drawn that the banknote does not belong to the given class.

In one of the method implementations, when a function for each area is computed, transformation is made that provides reduction in scattering of the function value for the same area for various banknotes that belong to the same class."

In one of the method implementations, when computing the distance between the banknote and the previously known class, it is checked whether the sum value has exceeded the value of the maximum allowable distance for the given class; in case it has, any further computation stops, and a conclusion is made that it is impossible for the banknote to belong to the given class.

According to one of possible implementations of the given method in compliance with the first variant, the banknote image signature is additionally found as a binary number by putting in correspondence each bit of the signature with a definite pair of areas; for each pair of areas the function values corresponding to these areas are compared, the value of each signature bit is set according to the logic result of comparison, and prior the distance between the banknote and the class in the feature space is found, the second distance to this class is additionally found; to get it, this class is represented by a class centroid signature known beforehand, by a masking bit pattern known beforehand and by the maximum allowable second distance to the centroid. To do so, the bits of the banknote signature are found that differ from the corresponding bits of the class centroid signature; the bits masked by a masking bit pattern are rejected; the second distance between the banknote and the given class is found by counting the number of differing bits that are not masked by the masking bit pattern, and the found distance is compared with the second maximum allowable distance to the given class; if the found distance exceeds the maximum allowable value, a conclusion is drawn that the banknote does not belong to the given class and the next known class is then considered.

The claimed technical result is achieved when according to the banknote classification method in compliance with the second variant a banknote is scanned to obtain its two-dimensional image consisting of pixels; the obtained image is separated into areas in compliance with the specified partitioning scheme and the function for each area is computed with a definite algorithm in such a way that its value depends on the values of the pixels within the area; the signature of the banknote image is found as a binary number by putting in correspondence each bit of the signature with a definite pair of areas; for each pair of areas the function values corresponding to these areas are compared, the value of each signature bit is set according to the logic result of comparison; the signature is compared with the banknote classes known beforehand; each class is represented as a centroid of the class known beforehand, the masking bit pattern known beforehand, and the maximum allowable distance to the centroid; to do so, the bits of the banknote signature are found that differ from the corresponding bits of the class centroid, the bits masked by a masking bit pattern are rejected; the distance between the banknote and the given class is found by counting the number of differing bits that are not masked by the masking bit pattern; the distance found is compared with the maximum allowable distance to the given class; if the found distance does not exceed the maximum allowable one to the given class, a conclusion is drawn about possible membership of the banknote in the given class; if the found distance exceeds the maximum allowable distance to the given class, the conclusion is drawn that the banknote does not belong to the given class.

In one of the implementations of the second variant of the method for finding the distance to the class, there is additionally computed a specified function whose arguments are the number of differing bits not masked by the masking bit pattern, and also the number of the masking bits in the class bit pattern.

In one of the implementations of the second variant of the method, pairs of areas are composed of the areas having a common boundary.

For both variants of the method there is possible implementation when after drawing a conclusion concerning possibility of the banknote membership in the known classes, an additional comparison is made between the distance from the banknote to the classes the banknote may belong to; there is found the class the distance to which is minimal and a conclusion is drawn about the banknote membership in the found class.

The classes the membership to which may be checked according to the claimed method will be called known classes. Peculiarities of the usage area of the device determine a set of the known classes. If the device is meant only for processing banknotes of one country, its set of known classes shall include all denominations of banknotes of the given country, each in 4 possible orientations. The multicurrency devices shall have an increased set of known classes so that to cover all denominations and orientation of the specified currency set. In case of implementation for a specific device, the claimed method is adjusted for a definite set of the known classes by selecting parameters (known beforehand). The claimed method detects a banknote membership in one of the known classes, or draws a conclusion that it does not belong to any of the known classes.

According to both variants of the method, the class a banknote may belong to is defined by calculating the measure of banknote correspondence to some class and its further estimation. Contrary to prior art, the digital scan of banknote is separated into areas according to the partitioning scheme common for all known classes. Therefore, the input data for estimation of the measure of correspondence is computed one time; its computational complexity does not increase together with the growth of the number of known classes. When calculating the measure of correspondence, both variants of the method employ only logical operations as well as addition and subtraction which the processor makes in the fastest way. Contrary to the proposed method, prior art assumes usage of matrix arithmetic containing a large number of multiplication operations, and respectively more complex computationally. Both variants of the method use calculation of the measure of correspondence as an integral characteristic that generally reflects the degree of membership of a banknote in a specific class. Because of that, the local banknote deviations from a typical representative of its class do not considerably degrade the measure of correspondence. On the contrary, common deviations of a digital image typical for the banknotes of other classes make worse the measure of correspondence. Therefore, there is less probability of incorrect classification.

The first variant of the invention allows calculation of the measure of correspondence that takes into account not only the average values of pixels in some banknote areas, but also allowable deviations from these values. So, distinctions from a typical banknote of the given class related to the inherent variability of certain areas of the banknote do not degrade the measure of correspondence to the given class. Among such areas it is worth mentioning the zones of banknote numbers and security metallic threads, the areas of the central fold, the edges and the corners. On the other hand, distinctions in the areas where the banknotes of one class are similar result in worsening the measure of correspondence. This reveals the banknotes of other classes that have relatively small distinctions from the banknotes of the given class, and forgeries. Thus, there is lowered probability of an incorrect classification and ensured an increased accuracy of taking decisions about membership in the given class.

According to the second variant of the invention, the measure of correspondence is calculated by a bit-by-bit processing of only three binary words which ensures an especially high classification speed. The usage of the masking pattern makes it possible to exclude from consideration the pairs of areas with an instable relation of the function values within the limits of one class. So, there is decrease in the influence of the banknote inherent variability on the measure of correspondence in the way similar with the first variant The first variant ensures a slightly higher classification accuracy in comparison with the second one, as the difference degree of the areas is characterized by an integer number and not by a bit. That is why during the banknote processing, the first variant may be used with a simple clarification procedure or without it which ensures a high speed. On the other hand, the total speed of the banknote processing consisting of the second variant classification and a further class checking turns out to be rather high as classification is extremely fast, and checking concerns only a small remaining part of the known classes. Thus both variants ensure a high speed of the banknote processing.

In both variants of the invention, classification starts with obtaining of a digital scan of banknote in the banknote processing device. The scan may be formed on the base of various physical principles. The banknote processing devices respectively use sensors that register various physical characteristics of a banknote. The most widespread are optical sensors that register the banknote characteristics of emission transmission or reflection for the specific wavelengths in the visible, infrared and ultraviolet bands. Besides this, optical sensors are used to register different types of luminescence. Besides optical sensors, there are also widespread magnetic sensors that register magnetic permeability or residual magnetic induction of a banknote. There are also used sensors measuring the banknote electric permeability and its thickness.

Usually sensors register sequences of readings while banknote moves linearly. This process is called banknote scanning. From the point of view of a geometrical reference to the banknote surface, the results of sensors operation may be represented in a digital scan of banknote in the form of linear or two-dimensional arrays. They contain digitized readings of the values registered by the sensors.

The linear arrays describe distribution of a certain parameter on a banknote surface along a straight bar located on the banknote surface in a certain way. As an example of such an array is the array of the values of the signal of a magnetization sensor whose sensitivity area forms a straight bar during movement along the banknote surface.

Two-dimensional arrays describe distribution of some parameter in the rectangle areas located on a banknote surface in the form of rows and columns As an example of the two-dimensional array is the result of the banknote surface optical scanning in reflected light measurement mode. Rather often a two-dimensional optical component of the digital scan of banknote is called image and the elements of a two-dimensional array—pixels. In spite of the fact that in most cases the two-dimensional arrays are formed by optical sensors, there are also known the devices that register the two-dimensional arrays of a residual magnetic induction.

Banknotes may be processed both on the base of linear and two-dimensional arrays and on the base of their combination. In this case, the usage of only linear arrays does not allow characterizing of various banknote classes with a sufficient certainty as the characteristic features of banknotes that belong to some classes may turn out to be beyond the limits of the bars registered by the sensors. That is why the devices that register two-dimensional arrays are used in most practical applications that need high quality of processing of banknotes of various classes. To enhance the certainty of the banknote identification and rejection of forgeries, linear arrays are sometimes added to two-dimensional ones. According to the claimed method, the data of two-dimensional arrays are used for classification. The data of linear arrays may be used at the stage of an additional checking of the class if it is envisaged after classification is completed.

When the digital scan of banknote is obtained, the features are extracted for to perform classification. Feature is a numerical value characterizing the banknote digital image. Each feature is calculated on the base of two-dimensional data of the digital image according to a specified algorithm. To determine a feature (in compliance with the claimed invention), the obtained image is separated into areas according to the specified partitioning scheme. The areas may be of any form. Mutual overlapping of two and more areas is acceptable. According to a specified algorithm, a function is computed for each area; the function value depends on the values of the pixels within the area. The simplest example of such a function is an averaged value of the pixels from a definite two-dimensional array that fall within the area. The way a specific selection of the areas and the functions corresponding to them is made shall help characterize mutual differences of the banknotes of all known classes with the maximum possible degree. The way the features shall be selected according to the terminology accepted in the image recognition theory shall ensure a reliable discrimination of classes. According to the practical experience, it is possible in most cases.

In case a large number of areas are used, it becomes possible to characterize more accurately the distinctions between banknotes of different classes. However, further computational processing of the features becomes more complicated with the number features increasing. This growth has a linear character in the claimed invention, while in prior art the computational complexity of processing rises according to a quadratic law, depending on the number of features. It is quite clear that the number of features has the limit at exceeding which the computational complexity of the features processing prevents reaching of the required speed of the device.

Each digital scan of banknote is placed in the n-dimensional feature space in correspondence with the point whose coordinates are the values of the corresponding features. To determine classes to which a banknote may belong to, the distance is calculated from each of known classes to the banknote being analyzed. The distance to a class is some mathematic characteristic; the smaller it is, the more the banknote resembles a typical representative of the specified class. The distance is calculated basing on banknote feature vector. The distance is used as a measure of correspondence to the specified class. Variants 1 and 2 use different distance calculation methods.

DETAILED DESCRIPTION OF SPECIFIC EMBODIMENTS

Figure 1:
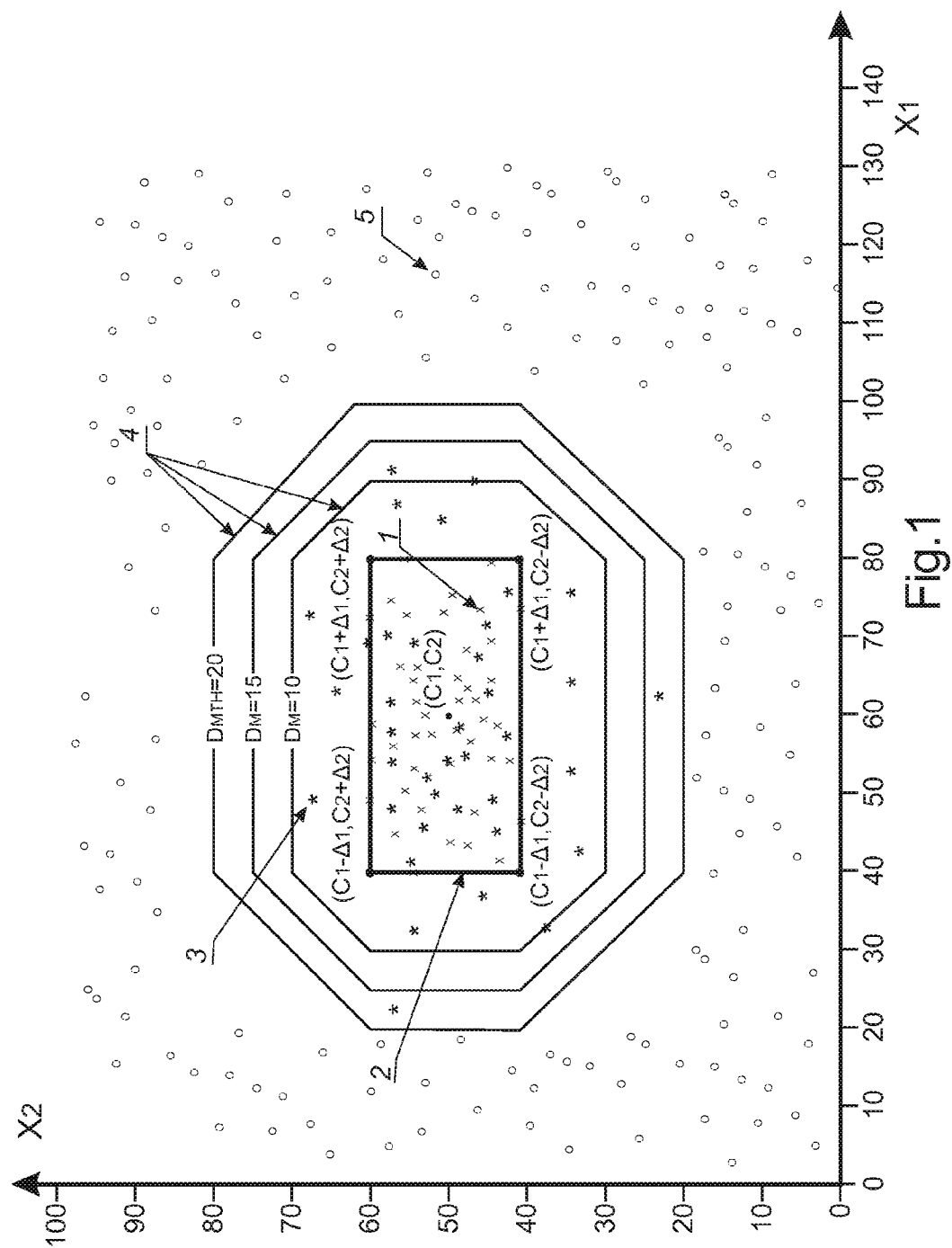
FIG. 1 shows class location in the feature space.
Figure 2:
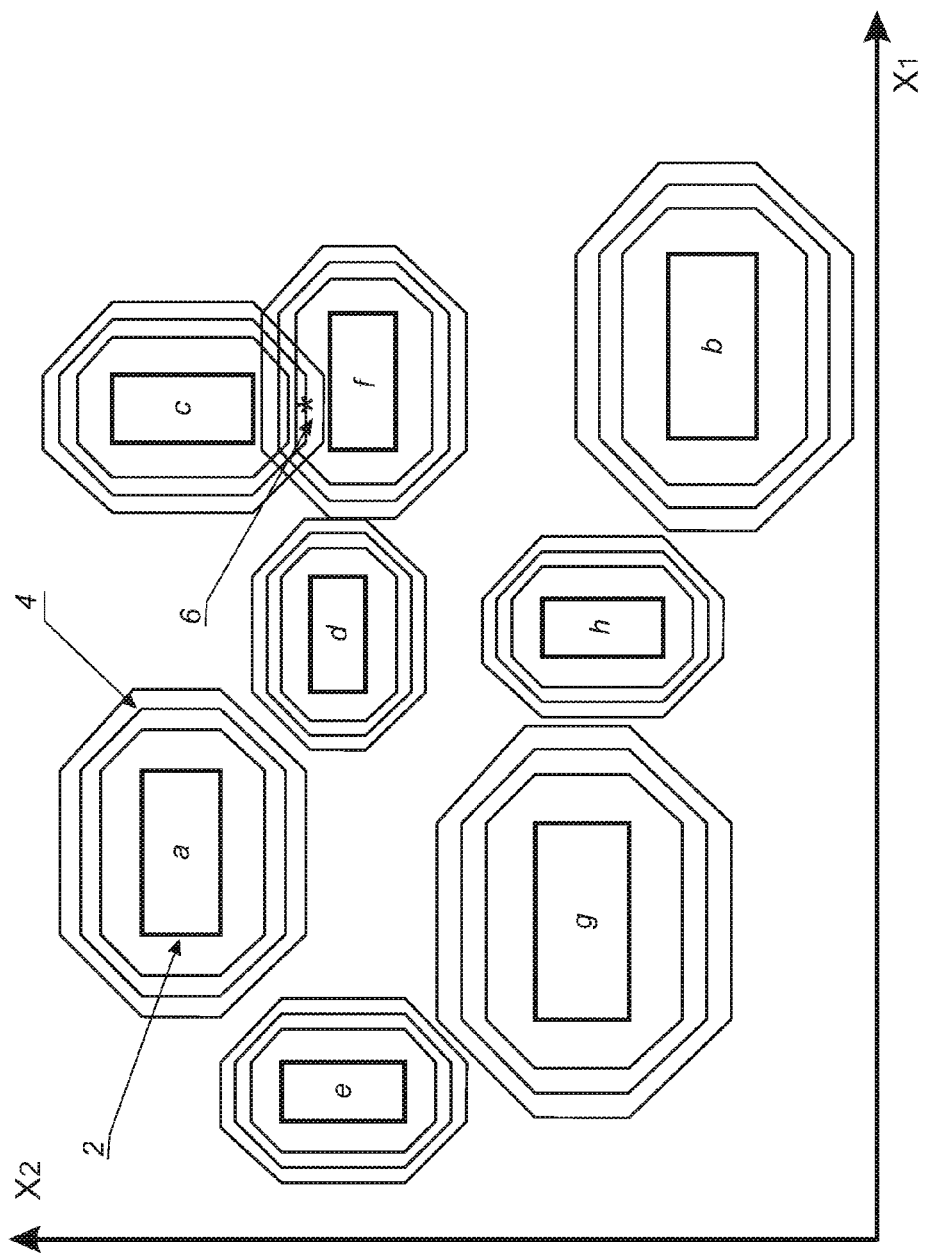
FIG. 2 shows a mutual location of the known classes in the features space.

FIG. 1 and FIG. 2 show calculation of the distance from a banknote to the specified class according to variant 1. For simplicity, a flat rectangular coordinate system with two coordinate axes is used to depict the feature space. In reality, dimensionality n of feature space may reach 100 and more, but it is practically impossible to show it in a drawing. A three-dimensional space is represented with clarity loss, but representation is absolutely impossible for the spaces of a higher dimensionality. Nevertheless, a conclusion drawn for a two-dimensional space, without loss of generality may be extended to a common case of the n-dimensional space.

Each banknote in the figure is represented by point $X=(X_1, X_2)$. The class is given by centroid $C=(C_1,C_2)$ and a vector of allowable deviation $\Delta=(\Delta_1,\Delta_2)$. These values are determined during analysis of membership in the given class of a large number of banknotes (the so-called training banknote set). Each training banknote 1 in the figure is represented by a cross. During learning, it is necessary to build rectangle 2 as small in size as possible which will cover all available training banknotes 1. Such a rectangle will be called later on as the class model. In the n-dimensional space, the class model is hyperparallelepiped. The center of the class model is the class centroid $C=(C_1,C_2)$, and half size of the class model by each coordinate gives a corresponding component of the deviation vector $\Delta=(\Delta_1,\Delta_2)$. The class model may be represented by a Cartesian product of ranges $([C_1-\Delta_1, C_1+\Delta_1], [C_2-\Delta_2, C_2+\Delta_2])$.

The elements of centroid vector C characterize the average values of features of banknotes of one class. The elements of the vector of allowable deviation $\Delta$, on the contrary, characterize variability of particular features in the collection of training banknotes 1. Due to the described variability, some features of a banknote of the specified class that correspond to the variable zones may have a higher deviation from centroid C than the ones corresponding to the zones with a small variability. The components of vector $\Delta$ help to specify the individual deviation limits of the features within the class model limits.

Banknotes 1 (taken for learning) completely fall within the limits of class model 2. Banknotes from circulation 3 are designated with an asterisk. Most of them fall within the limits of the class model. But some banknotes from circulation 3 do not fall within the limits of class model 2; they go beyond its limits. This relates to variability of features at a large number of banknotes in circulation. Such variability cannot be taken into account during learning.

To find the distance between the banknote and the specified class (by variant 1), the so-called "Manhattan distance" is used. By its definition, the Manhattan distance between two points $A=(A_1,A_2)$ and $B=(B_1,B_2)$ is calculated as a sum of the modules of differences of the corresponding coordinates of points $|A_1-B_1|+|A_2-B_2|$. The Manhattan distance known in mathematics as one of the alternatives to a conventional notion of "Euclidean distance" is calculated as $\sqrt{(A_1-B_1)^2+(A_2-B_2)^2}$. To find the Manhattan distance, there are used only computation operations of addition, subtraction and comparison. Calculation of the Euclidean distance additionally needs more complicated operations of squaring and square-rooting. That is why the computational costs for finding the Manhattan distance are much lower than the costs for finding the Euclidean distance. As a closeness characteristic, the Manhattan distance does not perform noticeably worse compared to the Euclidean distance.

We are going to use the Manhattan distance between banknote 3 and model 2 of this class as the distance from banknote 3 to the class. As the class is represented by model 2 of the class in the form of a rectangle (hyperparallelepiped), and banknote 3 is represented by a point, the distance between model 2 of the class and banknote 3 is the minimum Manhattan distance between this point and a set of the model rectangle (hyperparallelepiped) points. Symbol $D_M$ will be used for its designation.

To calculate the distance between banknote $B=(B_1,B_2)$ and the specified class, for each separate coordinate in the feature space there is found the module of difference between the values of this coordinate of banknote feature vector B and centroid vector C, and the value of this coordinate of deviation vector $\Delta$ is subtracted from it. The distance value is found by summing only positive values obtained. Actually this computational process finds the minimum Manhattan distance between banknote B and the points of model $([C_1-\Delta_1, C_1+\Delta_1], [C_2-\Delta_2, C_2+\Delta_2])$ of the specified class.

Banknotes 1 from a training collection always has zero distance $D_M$ from the banknote to the class. Banknotes 3 from circulation that belong to the specified class have zero distance $D_M$ to this class only if they lie inside its model 2. The banknotes that do not fall within the limits of model 2 of the class will have some positive distance $D_M$ to this class. When a banknote from circulation 3 belongs to the specified class, the value of distance $D_M$ will be small. Banknote 5 that belongs to another class has large distance $D_M$ to the specified class. This property is used for the banknote classification according to the claimed method.

FIG. 1 shows the boundaries of the areas as octagons 4, for which internal points distance $D_M$ to the specified class is less than the found value. In the n-dimensional space these areas will be limited by polyhedral hypersurfaces. To exclude the banknote not relating to the specified class, it is necessary to determine the maximum allowable value $D_M=D_{MTH}$ at which all banknotes of the specified class will be inside the corresponding polygon. To check a banknote relation to the specified class, the distance from the banknote up to this class is calculated, and it is checked if this distance exceeds the maximum allowable value $D_{MTH}$ for this class. If it does not exceed $D_{MTH}$, a conclusion is drawn that the banknote may belong to the specified class. If the distance is more than $D_{MTH}$, a conclusion is drawn that the banknote does not belong to the specified class.

FIG. 2 shows location of known classes a to h in space; each class is represented in the form of its model and a family of the boundary lines (hypersurfaces). An external boundary line (hypersurface) for each class corresponds to the maximum allowable distance $D_{MTH}$ and is called class a boundary. The point corresponding to the classified banknote may fall within the boundary limits of some class. In this case, a conclusion is drawn that the banknote may belong to this class. If the point does not fall within the boundaries of any class, a conclusion is drawn that the banknote does not belong to any of the known classes.

To reduce a banknote processing after its classification, the most preferable is arrangement of classes when their boundaries do not intersect. In this case, it is always possible to draw a conclusion that the banknote either belongs to one class or does not belong to any of the known classes. Such a conclusion enables the device to carry out the required operations of banknote handling; for example, transfer it to the stacker corresponding to the class the banknote belongs to.

The experience proves that optimal selection of features, in most cases, enables such an arrangement of the classes when their boundaries do not intersect. However, in certain cases it is impossible; for example, for the versions of banknotes of one denomination that are similar in appearance but usually differ only in small details. Boundaries of classes c and f intersect, as is shown on the figure. Point 6 corresponding to the banknote falls within the limits of both classes. That is why the result of its classification is two classes: c and f. In this case, the device needs additional actions to check which of the found classes the banknote belongs to.

Additional data obtained from the digital scan of banknote may be the base for checking. However, classification may be carried out in such a way that it will result in finding of only one class. To make it, one compares the distance from the banknote to the classes membership in which was acknowledged as possible. Then one finds the class the distance to which is minimal and draws a conclusion that the banknote belongs to the found class. For example, among two classes c and f, the distance from point 6 to class f is less than to c. Therefore, a conclusion is drawn that the banknote belongs to class f. If selection of features is not optimal, classes will be badly separated in space and intersect one another with their boundaries. In this case, the classification quality will drop as many classes may simultaneously be admitted as possible ones, and selection according to the minimum distance does not give assurance about the correct class determination. As a result, there will be necessary additional checking of the classification results, but this clarification will have computational penalty.

Figure 3:
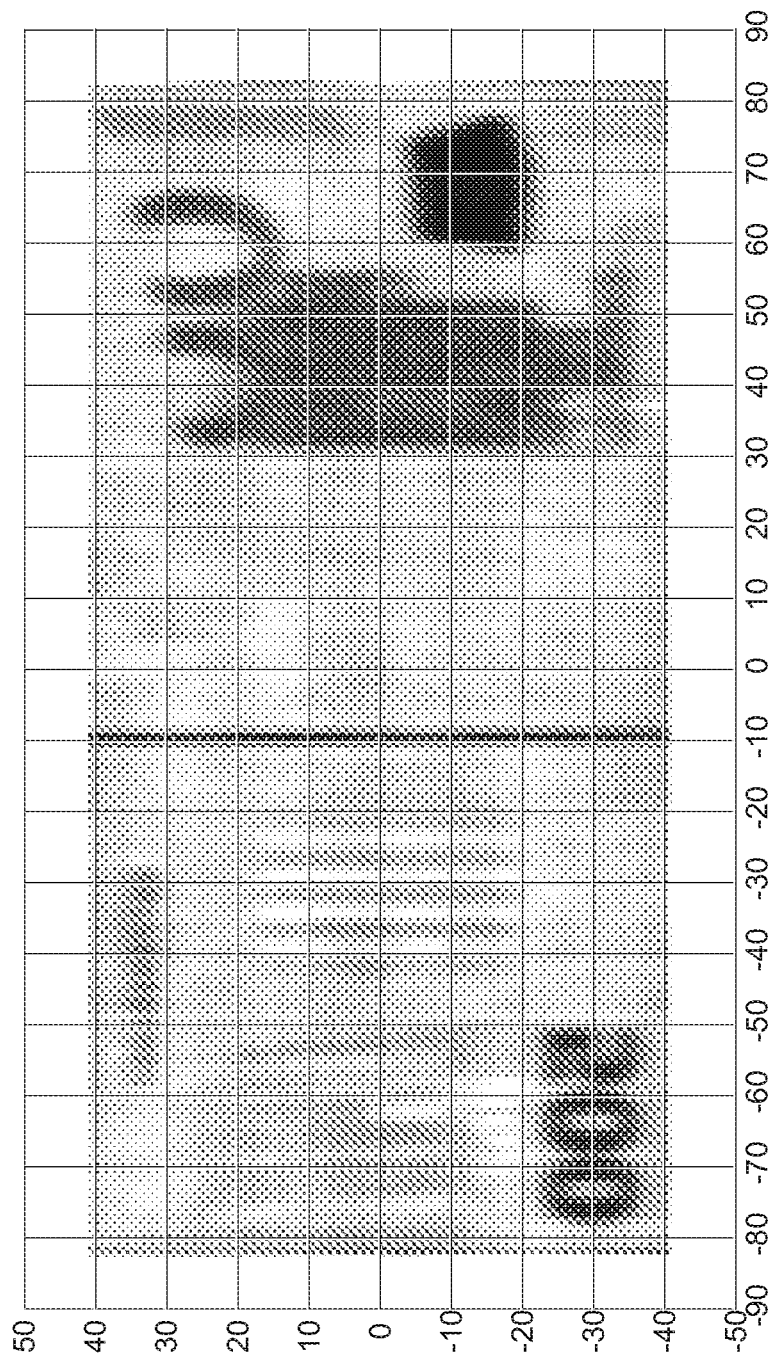
FIG. 3 shows an ordered regular partition of the digital scan of banknote into the square zones of 10 by 10 pixels, the 500 Euro bill image in infrared light is taken as an example.

Selection of features consists of selection of areas and selection of a feature computation function. Selection of the areas may be optimized so that to improve recognition of one class or several classes by arranging the areas in the banknote places that most considerably differentiate the banknote from the other classes. However, when the number of known classes is large, arrangement of the areas shall equally enable them to detect the distinctive features of banknotes of all known classes. Therefore, an ordered regular separation into areas is identical in shape and size is considered close to the optimal. FIG. 3 shows an example of such partitioning, where the square areas are arranged in rows and columns.

Averaging of the values of pixels from a two-dimensional array that fall within the specified area is a fast and a sufficiently effective method of feature computation. However, if banknotes are strongly worn, the value of the feature for the same area calculated for the banknotes with a different degree of wear may differ significantly. The result is the increase in the class model size and in the required value of a maximum allowable distance to class $D_{MTH}$.

There is a method of transformation of the feature computation function for each area so that to reduce scattering of the data of this function for the same area for different banknotes that relate to the same class. In this case, decrease in the class model size and in its boundaries becomes possible which in its turn reduces intersection possibility of the boundaries of classes and improves their separation. As a result, the classification quality improves.

As the first step, the averaged value of pixels of the specified two-dimensional array falling within the specified area, is calculated. Then the obtained value is transformed so that to take into account the differences between banknotes of one class in circulation. The differences between banknotes leaving the printing factory are relatively small, but the differences grow as they wear. Banknotes wear may be divided into general (in all banknote areas) and local (relating to the separate banknote zones). Local wear is difficult for modeling and consideration, as it is related to the individual damages of banknotes: staining, piercing, tearing, corner folding and foreign inscriptions. General wear on the contrary is rather uniform for all banknotes and includes two main processes: abrasion of ink layer, and soiling.

Figure 4A:
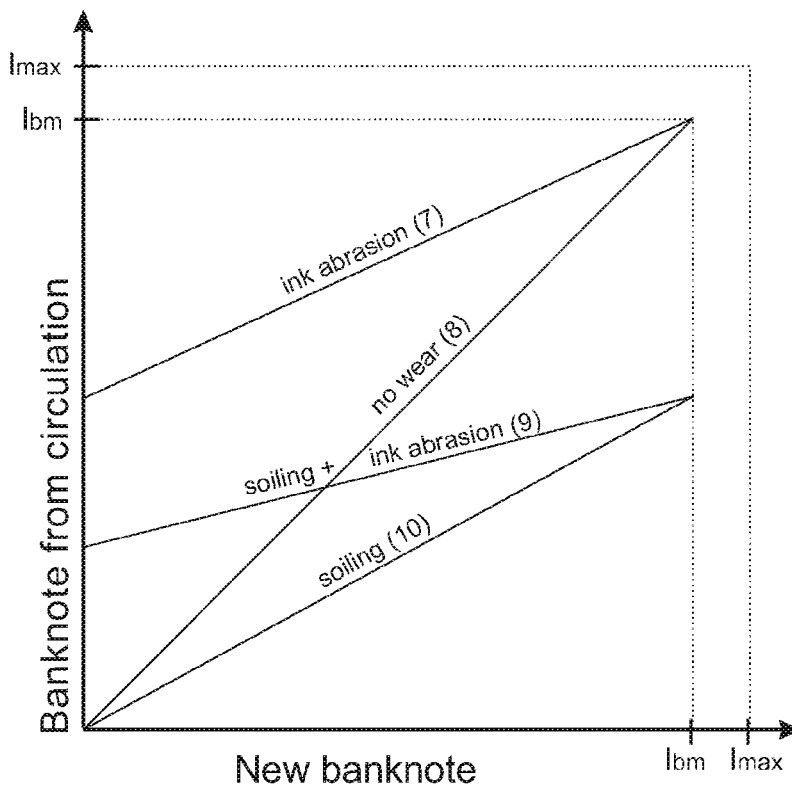
FIG. 4a contains a graph showing the change of the banknote transmission (reflection) levels with its wear.

Peculiarities of a common banknote wear (at a first approximation) are taken into account by a linear model of banknote wear, as it is illustrated by curves 7-10 in FIG. 4a. The linear model of wear is directly applicable to the characteristics of optical transmission and reflection. Soiling reduces the total transmission or reflection of paper. In its turn, abrasion of the ink layer results in reduction of the total banknote contrast. The FIG. 4a relates initial values of optical density in various areas of an absolutely new banknote (the abscissa axis) to the optical density values in the same areas after the banknote wear (the axis of ordinates). Ibm designates the transmission value of clean banknote paper of an unworn banknote. Imax designates the maximum sensor response. Straight line 8 corresponds to a practically unworn banknote, straight line 7—to a banknote with an abraded ink layer, straight line 10—to a banknote with a uniform soiling, straight line 9—to a soiled banknote with an abraded ink layer. The given model does not take into account nonlinear distortions at transfer of the optical density gradations. However as experience proves, the usage of the given model makes possible a significant reduction of the difference in features for banknotes of one class having different wear grade.

Figure 4B:
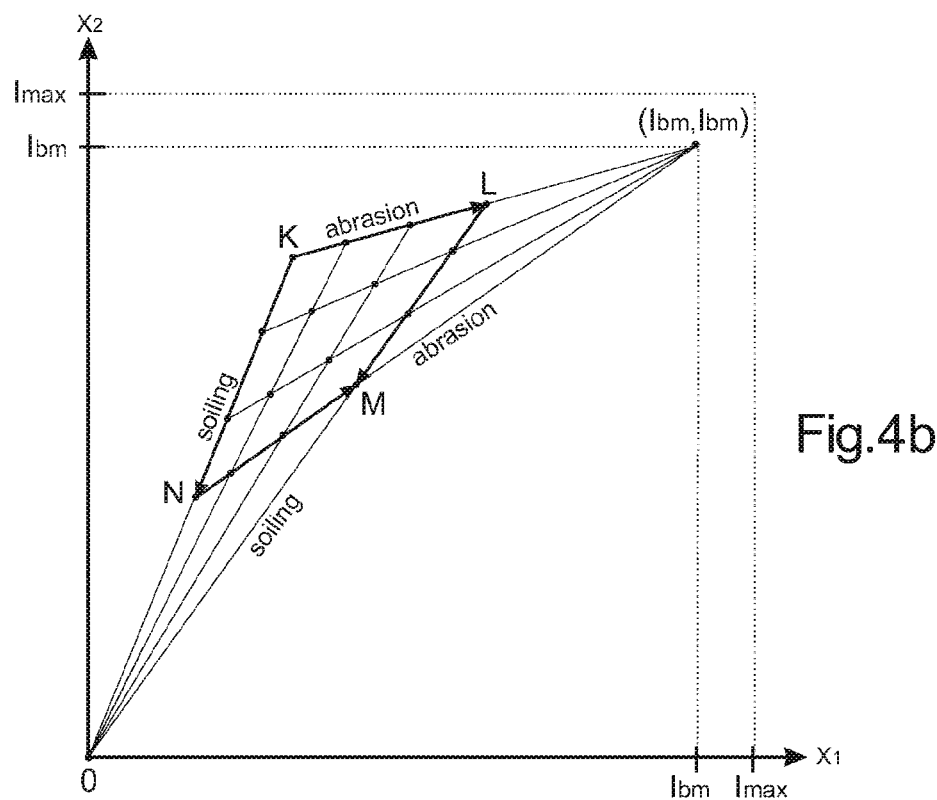
FIG. 4b shows graphically how the banknote moves in the feature space during its wear.
Figure 5A:
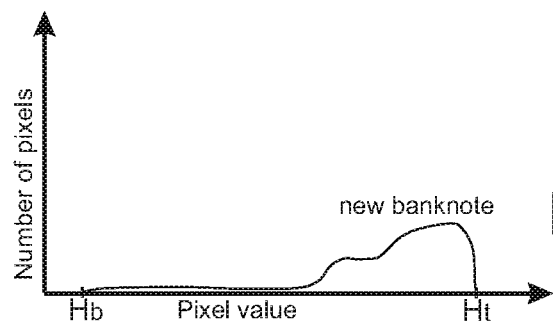
FIG. 5(a-d) shows the change of a banknote histogram during its wear.
FIG. 5e shows the histogram appearance after a linear transformation of the range of the values of pixels.
Figure 5B:
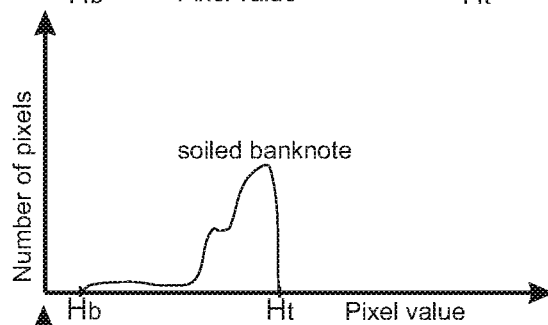
Figure 5C:
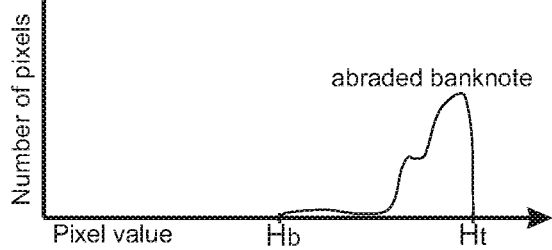
Figure 5D:
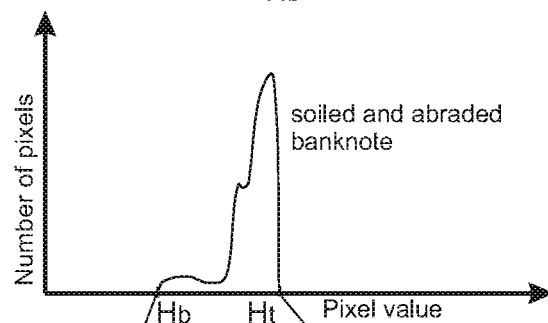
Figure 5E:
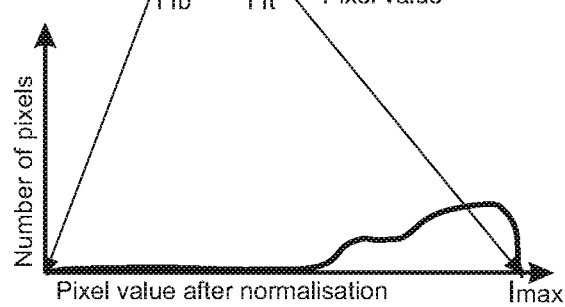

FIG. 4b shows the way the banknote position changes in the process of wear. Features X1 and X2 are supposed to be calculated with pixels values averaging function. The point (Ibm, Ibm) corresponds to the maximum values of the features reached on clean paper of an unworn banknote. Point O (on the contrary) corresponds to a complete lack of an optical response. Point K represents an unworn banknote in the feature space. As the banknote is abraded, its position shifts along a straight line in the direction of the point (Ibm, Ibm). Point L represents non-soiled banknote with an abraded ink layer. Similarly, when a banknote gets soiled, its position shifts along a straight line in the direction of point O. Point N represents a soiled banknote with non-abraded ink layer. Point M corresponds to a soiled banknote with an abraded ink layer. The wear level of banknotes represented by points L, M, N is supposed to be maximum allowable in use. Quadrangle KLMN defines a real position of the banknote in the feature space during its wear until this wear becomes unallowable.

According to the linear model, wear leads to changes of the banknote histogram (FIG. 5). FIG. 5a shows the histogram of an unworn banknote. Wear may be characterized by a range of values Ht and Hb between which lies the range of the banknote transmission (reflection) values. Banknote soiling (FIG. 5b) leads to contraction and shifting this range down, while banknote abrasion (FIG. 5c) leads to contraction of this range and shifting it up. A combination of abrading and soiling reduces the grayscale range even more and shifts it downwards (FIG. 5d). Calculation of each feature is started with averaging of the values of the elements of a two-dimensional array of the digital image that fall within the corresponding area. So, the array of the averaged values is created where each element corresponds to one feature. Then corrections are made in this array in such a way that its values were within the range 0 to maximum value Imax. For this, linear transformation of the initial values of features [Hb,Ht] is performed, to produce a new range of values of features [0,Imax], according to the formula:

$$Iout = (Iin - Hb)\frac{I_{max}}{Ht - Hb}$$

In this formula Iin is the feature value before transformation, Iout is the feature value after transformation. This transformation is applied to all elements of the feature array.

Linear transformation of range [Hb,Ht] to range [0, Imax] leads various histograms of the banknotes of one class (FIG. 5a-d) to a practically identical appearance (FIG. 5e), irrespectively of their grade of wear. After such a transformation the feature differences between the banknotes of one class but with a different grade of wear become small. Responsibility for these small residue differences relates to nonlinear changes of the optical density of worn individual banknotes and their local wear as well. A linear model of wear does not take these effects into account, neither they create any essential obstruction at classification.

Relating to class representation, the result of correction of the values of features is decrease in the coordinates of an allowable deviation vector in each area, as well as decrease in the maximum allowable value of distance $D_{MTH}$.

Figure 6A:
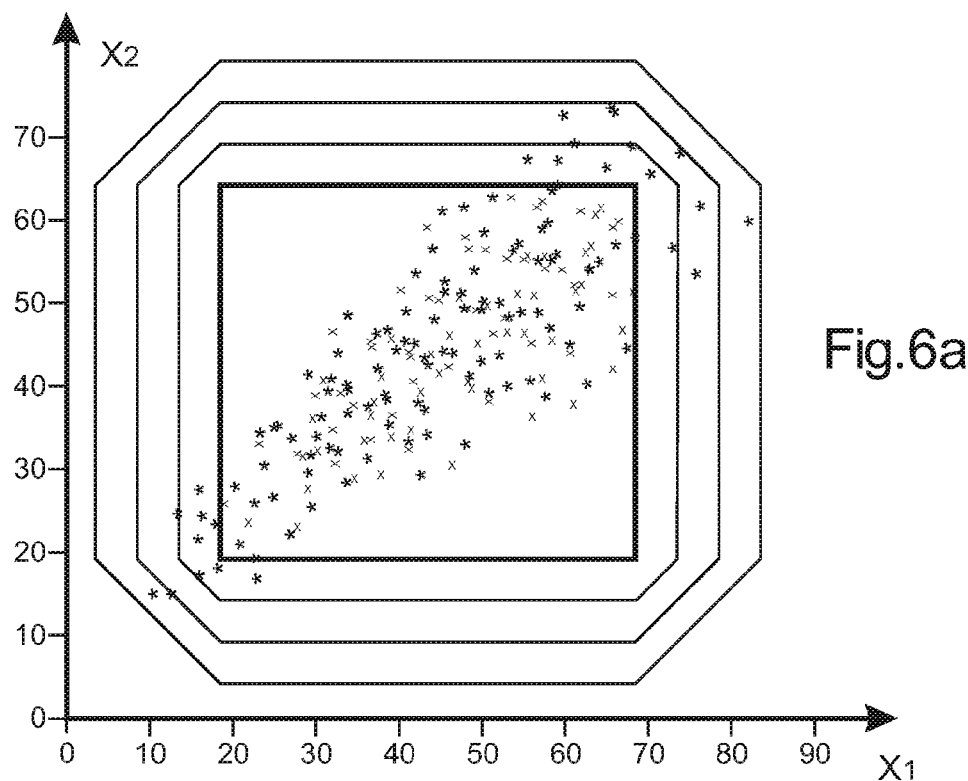
FIG. 6a shows class location in the feature space before a linear transformation of the range of the values of pixels, FIG. 6b—after the linear transformation.
Figure 6B:
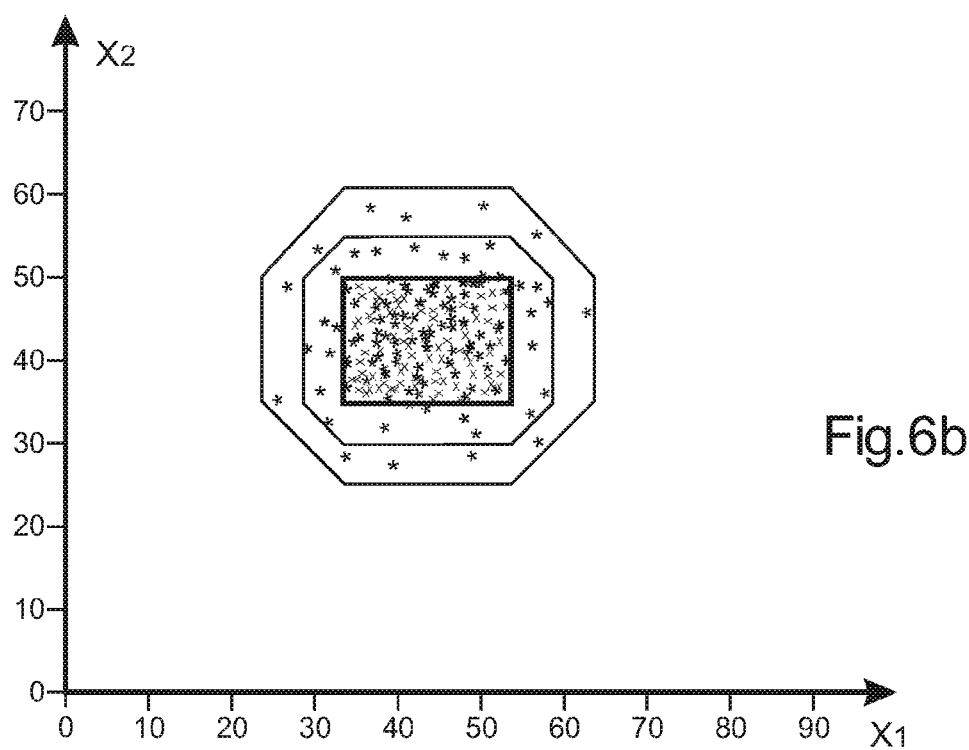

FIG. 6a shows distribution of a collection of one class banknotes in the feature space without correction. It is characterized by an incomplete filling of the model, because the form of the cloud of points representing a class is close to quadrangle KLMN shown in FIG. 4b, in accordance with linear model of wear. FIG. 6b shows distribution of the same collection of banknotes of one class in the feature space after correction. It is clear that the class size has reduced. After usage of a linear transformation of the range, all points of quadrangle KLMN in FIG. 4b collapse to one common point located in the middle of a new class model. Scattering of the points within the limits of the model and the class boundaries results from the effects not taken into consideration by the linear model of wear.

The linear transformation of features (mentioned above) depends on the parameters of the histogram of a specific banknote digital image, i.e. actually on the values of all its pixels. This transformation is individual for each banknote specimen, but drives the features to the values that differ little for various specimens of one class. Moreover, the transformation is not based on awareness of the banknote class and is made uniformly for banknotes of various classes. It is worth mentioning that correction made in compliance with the linear model of wear does not actually reduce the distance between the centroids of various classes, but it reduces the size of the models and the boundaries of the classes as such. As a result, the probability for intersection of the boundaries of various classes drops, leading to the classification quality improvement.

An additional speed-up of classification is possible for variant 1 of the method. It is based on the fact that during calculation of the distance between the banknote and the class, summed values are non-negative, so the accumulated sum never decrease. As soon as the sum exceeds the value of maximum allowable distance $D_{MTH}$, it becomes useless to continue calculation of the distance. Indeed, in this case it is already possible to draw a conclusion that the banknote does not belong to the specified class, and this conclusion cannot change if calculation continues. If we stop any further calculation of the distance at that moment, the total validation time will reduce. The further the banknote is located from the specified class, the more the reduction is.

To speed up classification, during the distance calculation the check is done to determine whether the accumulated sum has exceeded the value of maximum allowable distance $D_{MTH}$. If it has, any further distance calculation is stopped, and a conclusion is drawn that the banknote does not belong to the specified class.

Figure 7:
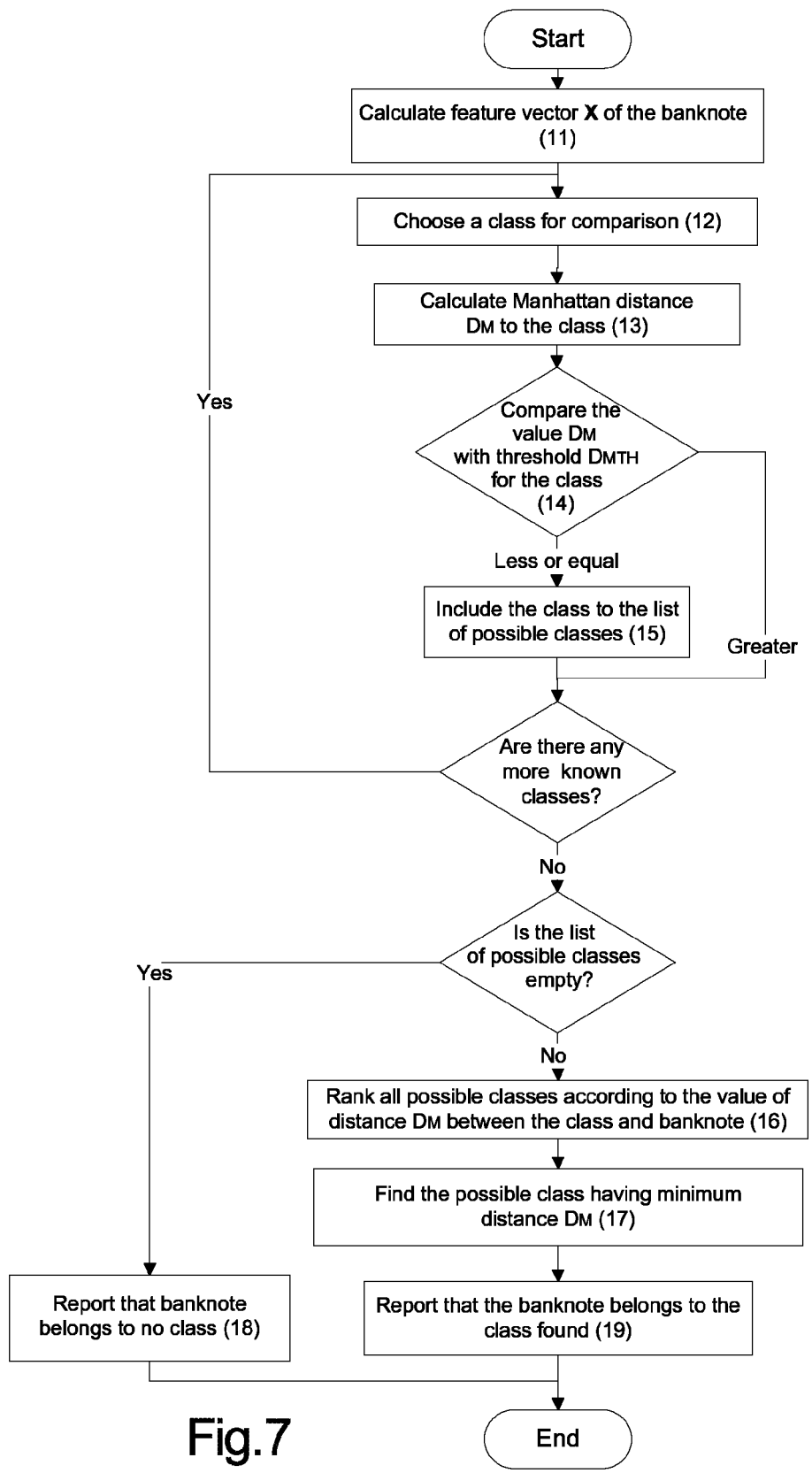
FIG. 7 shows a flow diagram of a classification algorithm according to variant 1.

FIG. 7 shows one of possible implementation sequences of the classification according to variant 1. The classification starts after the digital scan of banknote has been obtained. Initially (11) the banknote feature vector is calculated by using the banknote digital image and an area partitioning scheme. Then there is selected a class for comparison (12) and the Manhattan distance is calculated to this class (13). The obtained distance value is compared with the maximum allowable value for this class (14). If the distance is less than the maximum allowable value or equal to it, the class enters the list of possible classes (15). If there are some other known classes with which no comparison was yet made, the sequence from step 12 shall be repeated. If all known classes have already been used for comparison and the list of possible classes is empty, the report is made that the banknote does not belong to any of the known classes (18). If the list of possible classes is not empty, these classes are ranked according to the value of the distance to the banknote (16), and the class with the minimum distance (17) is selected. This class is reported as the classification result (19).

Before the claimed method according to variant 1 is implemented, it is necessary to carry out learning and determine the centroid vectors and deviation vectors for all known classes. Moreover, it is necessary to specify the maximum allowable distance to each of the known classes. Centroid C vectors and deviation vector Δ for the specified class are determined in the result of analysis of a training collection of banknotes for this class. The value of each feature for all banknotes of the training collection is found. Then analysis is made of value Xj of each j-th feature for the total collection of banknotes and its minimum Xj_min and maximum Xj_max values are found. After that the components $$Cj = \frac{Xj\_min + Xj\_max}{2} \text{ and } \Delta j = \frac{Xj\_max - Xj\_min}{2}$$

are calculated. The method of determination of the centroid vectors and a deviation described here is just one of possible.

It is worth mentioning that the class model may be defined and used without the centroid vector notion and the deviation vector notion. For example, the model may be defined in the Cartesian product form ([X1_min, X1_min], [X2_min, X2_min]) that will be equal to the one defined earlier and equal to ([C1−Δ1, C1+Δ1], [C2−Δ2, C2+Δ2]). At such defining it is possible to change the distance calculation method so that it would give the same result without using the notions of centroid vectors and deviation. However, we must take into account that such transformation of the classification method leads to the method equivalent to the one claimed according to the first variant.

According to the second variant of the invention (similarly to the first variant), the features are extracted with the use of the areas on the banknote and the computation functions. A specific distinction of the second variant is the use of compact representation of the ratios between the features in the form of the so-called signature. The latter is the number characterizing the banknote and it is acquired by computational processing of its scan.

Figures 8A, 8B, 8C:
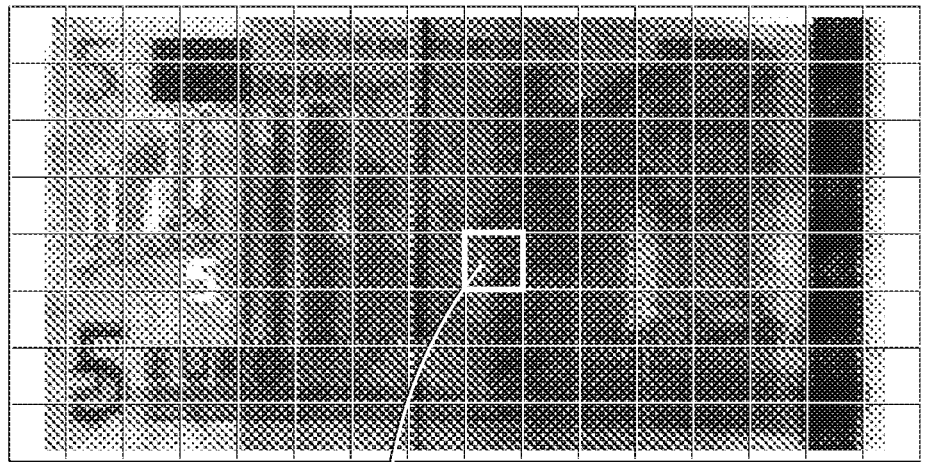
FIG. 8a shows a banknote partitioning scheme, FIG. 8b—the values of the features, FIG. 8c—the values of the obtained signature bits.

The signature is calculated from the values of the banknote features and represents a binary number whose each bit is associated with a specified pair of features that correspond to the image areas (see FIG. 8a-c). For each pair, the corresponding values of the features are compared, and each signature bit is set in accordance with a logical result of comparison. The values of features are not used for further classification; all operations are made with the use of signature.

The simplest type of the feature that may be used according to the second variant of the invention is averaging of the pixels of a specified two-dimensional array within corresponding area. As a logical result of comparison, one may use relations "the first feature is more than the second", "the first feature is more than the second or equal to it", "the first feature is less than the second", "the first feature is less than the second or equal to it". In practice, any of these relations may be used.

The signature characterizes relation between properties of the banknote areas. If the features are selected in such a way that relation between them for the banknotes of one class is practically constant, the signatures of such banknotes would coincide for most of the bits. The simplest feature type mentioned above satisfies such a condition. Indeed, the banknote wear in accordance with the linear model will cause a change of the absolute values of the features but it will not change the "greater/smaller" relation between them. On the contrary, for the banknotes that belong to different classes (at the corresponding selection of areas) the "greater/smaller" relations between the features will differ in a larger number of bits because of the banknote design differences. Thus, the number of differing bits in the signatures may be used as a measure of difference between banknotes.

A banknote class is represented by two binary words with an identical length—the signatures of the class centroid and of the masking bit pattern. Without reducing the generality of reasoning, we may consider the centroid of the class as the most characteristic banknote of the specified class. The centroid signature of the specified class may be built on the base of analysis of the training collection of banknotes of this class, but correspondence to any banknote of this collection is not obligatory for it.

A specially determined measure of difference between the signatures of the banknote being analyzed and the class centroid is used as the distance from the banknote to the class. This measure is based on a well-known notion of the "Hamming distance". By its definition, the Hamming distance between two binary numbers is equal to the number of differing bits of these numbers. For example, the distance between binary numbers 0011 and 1010 is equal to 2, as both of them have differing bits for their end positions.

For implementation of method 2, the Hamming distance notion may be modified so that to exclude from consideration the difference in the specific bits of the binary words being compared. The masking pattern notion is introduced for this purpose. A specific bit of the masking pattern which is equal to 1 indicates necessity to take into account the difference between two compared numbers in the same bit. On the contrary, 0 in the specific bit of the masking pattern indicates that the difference between two numbers in this bit shall not be taken into account when calculating the distance. For example, pattern 1110 indicates necessity of taking into account the differences in all bits, except the rightmost one. So, the modified Hamming distance between binary numbers 0011 and 1010 (with masking pattern 1110) is equal to 1 as only the difference in one, leftmost bit, is taken into account.

Using the masking pattern one can make exclusion from consideration of the bits corresponding to a pair of features that are variable within one class. For the pairs of features whose interrelation is practically constant for all banknotes of one class, the corresponding bit of the masking pattern shall be set to 1. On the contrary, for those pairs of features whose interrelation is not stable within the limits of the specified class, the pattern bit may be set to 0. In this case, only the signature bits that are practically constant for the banknotes of this class will be taken into account at calculation of the distance from a banknote to the specified class. So, the distance from the banknotes of the specified class to this class will be small. The distance from the banknotes of other classes will be larger as the differences in the signature bits between them and the class centroid are in many signature bits, including the unmasked ones.

In practice, the modified Hamming distance $D_H$ from the banknote with signature S to the class with centroid C and masking pattern M is computed (for example) in some way. First, a bitwise exclusive OR (XOR) operation between the banknote signature and the class centroid is made. Then, bitwise operation AND (AND) is used to reject the bits that shall not be taken into account at the distance calculation. The total result of these operations may be written down as Z=(S XOR C) AND M. If the number of the signature bits does not exceed the word length of the computing device processor, S is usually calculated with two computation operations of the processor. In case the signature length is more than the processor word length, S is calculated in a successive way (in several steps). In this case, S, C and M are divided into segments of the bits comprising the processor word.

Distance $D_H$ is determined by counting the number of "1" bits in binary number Z. This could be made by two different methods. One of the most efficient is division of Z into separate bytes and counting of the number of unit bits in each byte with the help of a 256-row table. The table contains the number of "1" bits for all possible values of a byte. The results obtained for each separate byte are summed and give the value of distance $D_H$. For the signature containing P bytes, P references to the table and the P−1 addition operations are required. So, calculation of distance DH between a banknote and a class according to the second variant of the method, is very fast and a computationally simple operation.

To take a decision about probability of the banknote membership in the given class, the found value of distance $D_H$ is compared with maximum allowable $D_{HTH}$ for the given class. If the distance exceeds the maximum allowable value, judgment is made that the banknote does not belong to the given class. Otherwise, we declare a possible membership of the banknote in the given class.

The distance $D_H$ from a banknote to a class is determined for all known classes. As a result, a conclusion about possible belonging to any class may be drawn either for one or several known classes or for none of them. Absolutely similarly to variant 1, in case of drawing a conclusion about possible banknote membership in several classes, it is necessary either to carry out an additional class checking on the additional features or to determine the class according to the distance ranking results. In the latter case, the class with a minimum distance to the banknote is acknowledged as the classification result.

The areas for finding signature may be selected by many methods. FIG. 3 shows one of possible methods of area partitioning and has already been under consideration when the first variant of the invention was under discussion. Similarly to variant 1, both averaging of the pixels within the area limits and averaging with a subsequent correction may be used as the feature computation function. It is worth mentioning that correction does not change relations of the features in pairs; therefore, use of correction has some sense only from the point of uniformity of a computational processing according to variant 1 and variant 2.

An essential advantage of the use of variant 2 gives selection of pairs of the areas with a common boundary. This allows decrease the influence of local wear on the distance between the banknotes of one class. If a local wear zone covers both areas in a pair, the values of the corresponding features change uniformly due to the local wear. So in most cases relation between the features remains unchanged in spite of the local wear. In particular, if a banknote local wear in a pair of areas follows the linear model of wear and the features are formed by averaging within the areas, the relation between the features in this pair does not change because of wear.

FIG. 8 shows formation of the banknote signature. FIG. 8a shows the image of a 5 Euro banknote obtained in transmitted red light and taken from the digital scan of banknote. A regular scheme of the banknote division into equal square areas is superimposed on the image. The areas are arranged in rows and columns and border with each other. The partitioning scheme is centered on the central point of the banknote image. The table in FIG. 8b shows the averaged values of pixels by the areas used as features. Each area corresponds to a separate cell of the table. To determine the signature bits, one selects all pairs of the adjacent areas located vertically one above another. A signature bit is equal to 1 if the feature of an upper area is greater than that of a lower area in the pair corresponding to the bit. Otherwise, the signature bit is equal to 0. FIG. 8c shows a full set of the signature bits that is formed in such a manner. The arrows indicate the way a pair of the features of the areas form a specific bit. Similarly, the signature may be supplemented with the bits formed as a result of comparison of the features of the adjacent areas located horizontally. A signature bit is equal to 1 if the feature of the left area is greater than that of the right area in the pair corresponding to the bit. Otherwise, a signature bit equals to 0.

The number of areas and a binary number length are determined by the time allowable for classification. The higher the number of bits, the longer the processes of the signature calculation and the signature comparison are. Besides, in case of a very large number of bits, the results of the method become sensitive to the scanning errors as the size of the corresponding areas gets small and already comparable with the positioning errors of the sensors in relation to the banknote. As a result, the signatures of the banknotes of one class differ significantly which results in the classification errors. At a small number of bits, the features reflect a small number of the banknote details which prevents distinction of the banknotes with a similar design. In both mentioned cases a non optimal number of the bits reduce quality of the banknote classification. An optimal number of the signature bits lies within the interval from several tens to several hundreds. With a small number of bits lying within the optimal limits, the requirements for further checking of the classification results become stricter. At the same time, in this case we manage to reach a very high classification speed.

When the result of classification according to method 2 is selected according to a minimum distance, comparison is made between the distances between the same banknote and several possible classes. Generally speaking, when calculating these distances, different numbers of area pairs are taken into consideration, in accordance with the number of "1" bits of the masking pattern. That is why the degree of importance of contribution made by each pair of the areas in the distance to the class also depends on the number of "1" bits of the masking pattern. In practice, if the distance to two classes is equal, the class to which a lower number of areas are used for the distance determination will have a higher degree of the banknote difference. Because of that classification according to a minimum distance may give an inaccurate solution if the distance from the banknote to several classes differs little.

To make comparison between distances to various classes more representative, we shall introduce an additional dependence of the distance on the number of "1" bits in the masking pattern. Let's give an example of such additional dependence. Let's k—the length of signature S, and m—the number of the pattern "1" bits. After calculation of the modified Hamming distance, it is additionally multiplied by the factor k/m. As a consequence, the impact made by separate pairs of the areas on the distance will be stronger when a smaller number of pairs of the areas is taken into account at the distance calculation.

Figure 9:
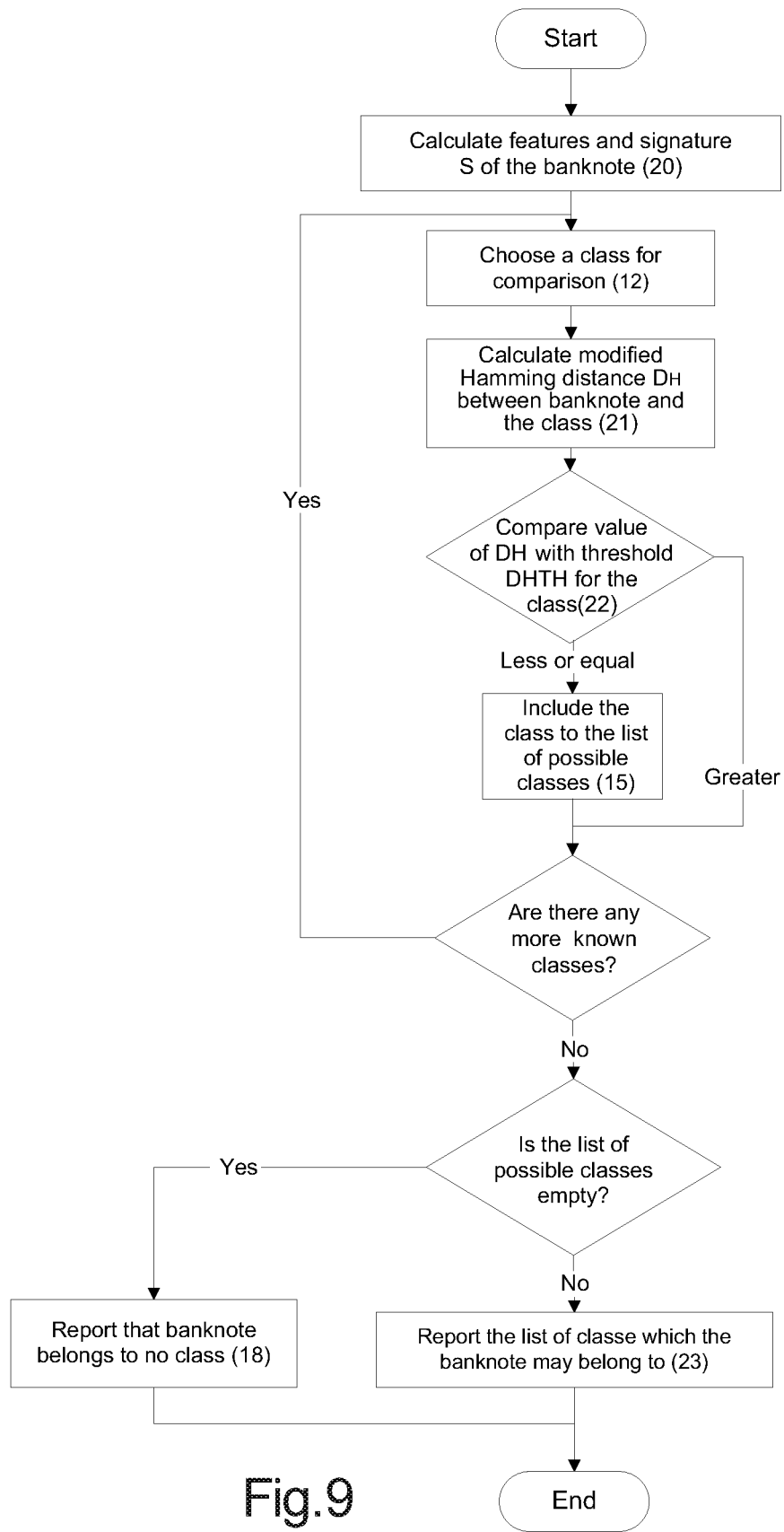
FIG. 9 shows a flow diagram of a classification algorithm according to variant 2.

FIG. 9 shows one of possible sequences of the classification implementation according to variant 2. Classification starts after the digital scan of banknote has been obtained. Initially (20) the banknote feature vector is calculated. Then a class for comparison (12) is selected and the modified Hamming distance to this class is computed (21). The obtained distance value is compared with the maximum allowable value for this class (22). If the distance is less than the maximum allowable value or equals it, the class enters the list of possible classes (15). If there is a known class which was not yet used for comparison, the sequence from step 12 is repeated. If all known classes have already been used for comparison and the list of possible classes is empty, it is reported that the banknote does not belong to any of the known classes (18). If the list of possible classes is not empty, the listed classes are reported as the classification result (23). The given sequence assumes class clarification checking after classification because more than one class may turn out to be the classification result.

Before implementation of the claimed method according to variant 2, it is necessary to carry out learning and determine the centroid signature and the masking pattern for each known class. Besides, it is necessary to specify the maximum allowable distance to each known class. To determine the class centroid and the masking pattern, there are calculated signatures for all banknotes from the training collection for the given class. Then each signature bit is successively analyzed and the resulting centroid signature is built. There are determined for each bit the frequencies of <<0>> in this bit and <<1>> in the signatures of the training collection banknotes. Each centroid bit is assigned the value which is the most frequently met in the signatures of the training collection banknotes.

Then a bit-by-bit forming of the masking pattern M starts. There is initially specified an empirically determined confidence threshold lying within the limits 0 to 0.5. For each bit the least of two occurrence frequencies of either value "0" or of value "1" in this bit is compared with a confidence threshold. Value <<1>> in the corresponding bit of the pattern is assigned just only when the least of these two frequencies does not exceed the confidence threshold. So, 0 is set in the bits with a high degree of uncertainty, while 1 is set in the bits with a low degree of uncertainty. The described method for selection of the centroid and the masking pattern is just one of many possible and is given here only to demonstrate preparation of the initial data to perform classification according to method 2.

The value of the maximum allowable value $D_{HTH}$ of the distance to each class is selected empirically, taking into account determination of the distance to the banknotes in circulation and not used for learning. This value shall exclude possibility of rejection of the banknote belonging to the specified class.

Figure 10:
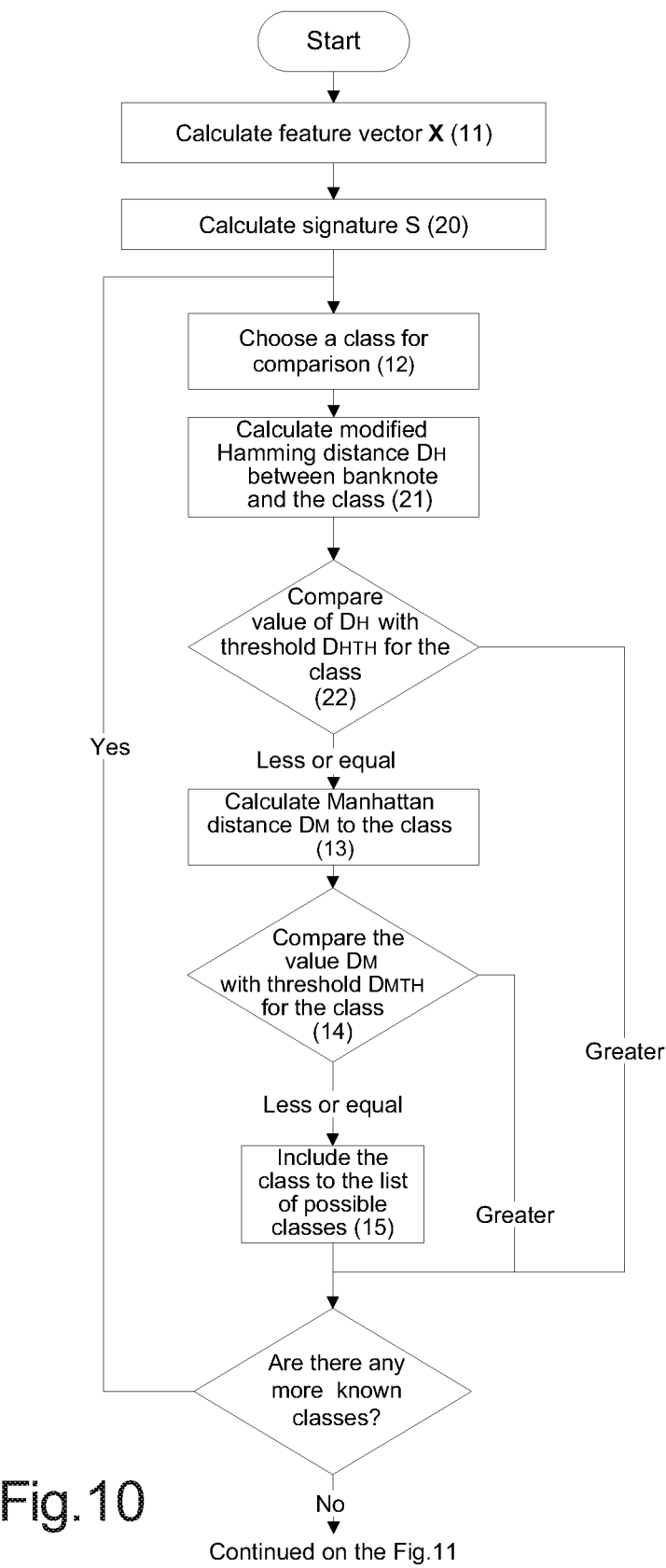
FIG. 10 and FIG. 11 show a flow diagram of the classification algorithm using the signature and the Manhattan distance.
Figure 11:
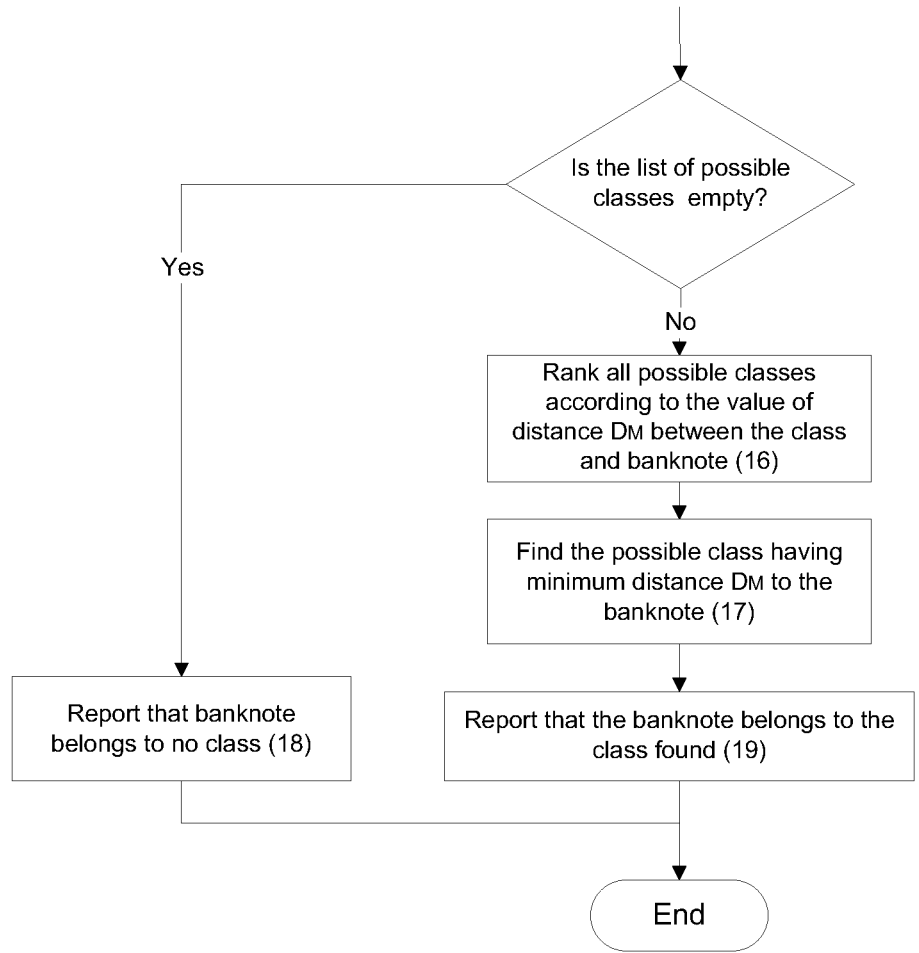

As the description of the invention variants shows, the variant 1 ensures a higher classification quality while variant 2 ensures a higher speed. To combine the advantages of both variants, classification according to variant 1 may be supplemented by a preliminary classification using the ideas variant 2 is based on (see FIGS. 10, 11). After calculation of the banknote feature vector (11), calculation of its signature (20) is made. The signature bits are calculated on the base of the "greater/smaller" relations between the designated pairs of the feature vector components. As we can see, there is used a common scheme of the area partitioning and the same function to obtain feature value for the specified area.

Prior to calculation of the Manhattan distance $D_M$ between the banknote and the specified class, the modified Hamming distance $D_H$ between the banknote and the same class is calculated (21). Then comparison (22) of the obtained modified Hamming distance $D_H$ with the maximum allowable value $D_{HTH}$ of this distance for the specified class is made. If the modified Hamming distance exceeds $D_{HTH}$, an immediate conclusion is drawn that the banknote does not belong to the specified class. In this case, further checking of the Manhattan distance to the given class is not made due to its meaninglessness and selection of the next class (12) starts. If on the contrary, $D_H \leq D_{HTH}$, checking continues and the Manhattan distance $D_M$ is calculated (13) and compared (14) with the maximum allowable value $D_{MTH}$. If DM does not exceed $D_{MTH}$, the conclusion is made that the banknote may belong to the specified class, and the latter enters the number of possible classes (15). If the distance is more than $D_{MTH}$, a conclusion is made that the banknote cannot belong to the specified class, and selection of the next of the known classes (12) follows. If all known classes have already been analyzed, it is checked if (at least) one of them was selected as possible. If the list of possible classes is empty, the banknote is reported not to belong to any class (18). If possible classes have been selected, they are ranked (16) according to distance $D_M$ and the resulting class having the minimum value of $D_M$ is selected (17). At the end of classification, the banknote is reported as belonging to this class (19).

As may be seen, the Manhattan distance is computed only when checking with the modified Hamming distance admits the banknote membership in the specified class. For a large majority of classes, only fast checking is made with the modified Hamming distance finishing with rejection of the class. Both modified Hamming distance and Manhattan distance are calculated together only for a very small number of classes. So, classification has the timing slightly exceeding the classification time according to variant 2. If a conclusion is drawn about a banknote possible membership in the specified class, the decision is based on a joint application of the criteria envisaged by variant 1 and variant 2. So, the certainty about the classification result in this case is higher than separately for the results of classification according to variant 1 and variant 2.

The claimed method is implemented to be used in a banknote counter equipped with computing unit containing a processor, a read only memory (ROM), a random access memory (RAM), an interface of communications with scan sensors, a drive control interface, and the user interface in the form of display and a keyboard. Mechanism of the counter is intended for counting banknotes, i.e. for their transfer from the hopper (one by one) through the zone of the scan sensors location, and their feeding to the stacker. There are installed additional sensors of the mechanism that check presence of banknotes in the stacker and the hopper, in the banknote transfer path of the counter, and sensors that monitor rotation of the electric drives of the mechanism.

The user interface enables the user to start counting after placing a batch of banknotes into the hopper. Then as the banknotes from the hopper are transferred into the stacker, the display shows the total number of counted banknotes by their denominations and the total sum of the money. If a banknote of an unknown class is detected during counting, it shall be stopped, and the corresponding message shall appear on the display.

The scan sensors are arranged in the form of a linear array (line) of photosensors on one side of the banknote transfer path, and a two-wavelength light source on the opposite side of the path. Emission of the light source is directed through the path to the array of photosensors. The way an array of photosensors and a two-wavelength light source are made enables them to register light transmission of the banknote along the total width of the path. The photosensor array is equipped with an optical system providing transfer of the banknote surface image to the surface of the photosensor array. A two-wavelength light source emits (synchronously with the mechanism rotation and by turns) either in the visible wavelength band or in the infrared (IR) wavelength band. A period of the light source switching corresponds to 1-millimeter movement of the banknote. So, when a banknote is transferred, the photosensor array registers the banknote transmission both at IR emission and in a visible light after each millimeter of its transfer. The illumination level of the photosensors enables them to operate in a linear mode at the light transmission through the banknote and in a saturation mode at light transmission through the part of the path without the banknote.

ROM is used for the processor firmware. The latter controls movement of the banknotes and communicates with the user by means of user interface. Moreover, the firmware realizes the functions of scanning and classification.

Figure 12:
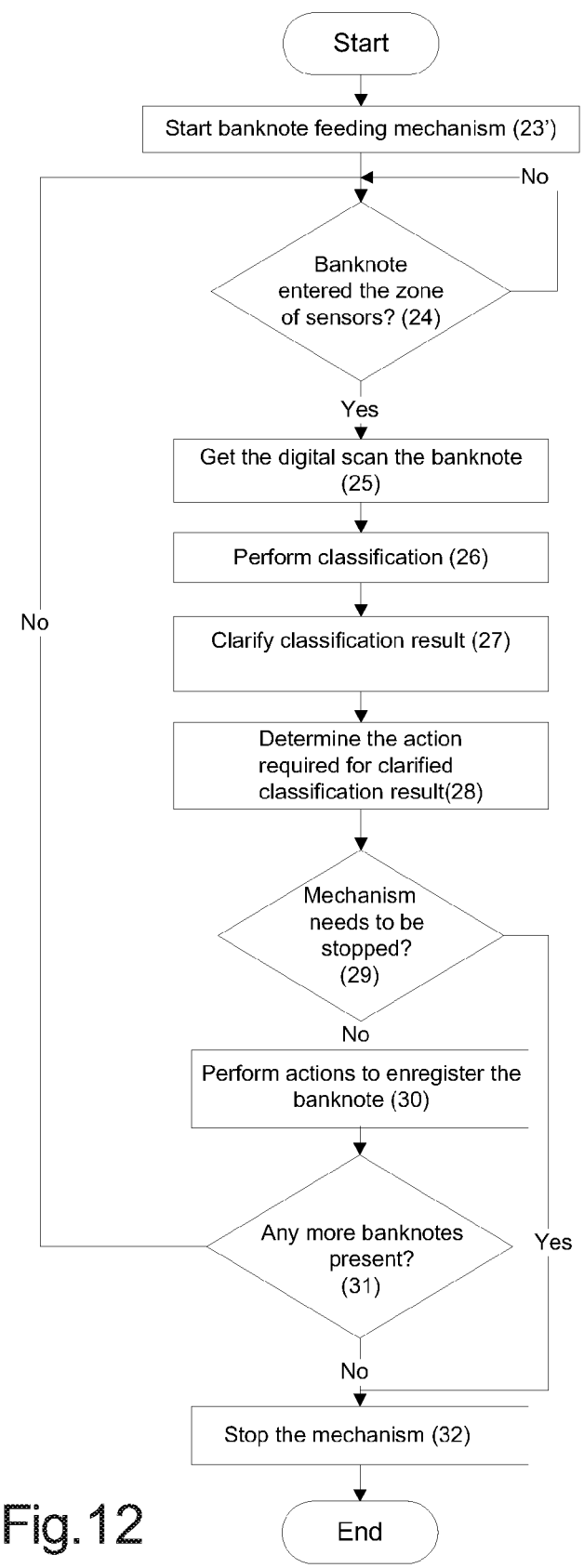
FIG. 12 shows a flow diagram of the sequence of banknotes counting operations in the device.

FIG. 12 shows a general sequence of operations when banknotes are being counted under the firmware control. Banknote counting starts as soon as the banknote batch is placed in the counter hopper. The mechanism starts (23') and begins feeding of the banknotes along the path toward the scan sensors. As soon as a banknote gets in the sensors zone, its scanning begins (25). While a banknote is moving 1 mm distance along the path, the program reads out twice the digitized values of the photosensor array signals—one time for the IR transmission, and a second time—for a visible light transmission. These digitized values are written in two corresponding arrays of the processor RAM. Scanning completes as soon as the program determines that all the photosensors of the array have saturated. As a result of scanning, the banknote scan is written in the RAM; this scan contains one two-dimensional array for the IR-emission transmission and the other two-dimensional array for the visible light transmission.

After scanning is over, the program starts the banknote classification basing on its digital scan (26). The classification is carried out according to the variants of the claimed invention; for example, as FIG. 7, or FIG. 9, or FIG. 10 and FIG. 11 show. An additional operation of checking to clarify the classification result (27) may be carried out upon completion of the classification. This operation is mandatory if the classification may report about a possible banknote membership in more than one class (for example, if implemented according to FIG. 9). If classification is implemented (26) according to FIG. 7 or FIG. 10, not more than one class may be its result; that is why the operation (27) is not absolutely obligatory. In this case, the operation (27) may be required to raise the certainty about the classification result due to additional checking with a higher number of features.

After that, the actions (28) are determined which are required as a consequence of classification result (26) and its checking (27) (if performed). Depending on the counter adjustments set by the user, the counter may stop (32) the mechanism or continue counting. For example, if it is found that the banknote does not belong to any class, stop may follow. If the decision is made to continue counting, the counter performs actions (30) to enregister banknote; for example, the banknote denomination is added to the total sum of the money of the batch being counted.

At this point of sequence the presence of banknotes in the hopper is checked (31). If the hopper is not empty, the program waits (24) till the next banknote gets into the zone of the sensors. If the hopper is empty and all the banknotes have been counted, the mechanism stops (32).

The described example of the invention implementation does not cover all possibilities of its implementation and application. On the contrary, the scope of this invention covers not only all possible combinations of the technical solutions described here, but also possible supplements and changes within the limits of the claims.

We claim:

1. A method of banknote classification wherein a banknote is scanned to obtain its two-dimensional image consisting of pixels, the image is separated into areas in compliance with a specified partitioning scheme; a function for each area is computed with a definite algorithm in such a way that its value depends on the values of the pixels within the area;
   a banknote feature vector is composed of calculated values by using the function values calculated for each area as coordinates in the feature space, and a conclusion is drawn about the banknote possible membership in at least one banknote class known beforehand;
   the conclusion is drawn on the base of a distance between the banknote and the class in the feature space;
   the class is represented by a class centroid vector known beforehand and by an allowable deviation vector known beforehand and by a maximum allowable distance to that class;
   to compute the distance between the banknote and the class known beforehand, for each separate coordinate in the feature space a module of difference is found between the value of this coordinate of the banknote feature vector and that of the centroid vector, followed by subtraction of the value of the allowable deviation vector for the given coordinate from the module; of all obtained values only positive ones are summed for the distance calculation, and a conclusion is drawn by comparing the distance between the banknote and the given class with the maximum allowable distance to the given class so that if the resulting distance does not exceed the maximum allowable distance to the given class, a conclusion is drawn about a possible membership of the banknote in the given class, but if the distance found exceeds the maximum allowable distance to the given class, a conclusion is drawn that the banknote does not belong to the given class.

2. The method according to claim 1, wherein during computation of the function for each area, a transformation is performed that provides reduction in scattering of the function value for the same area for various banknotes that belong to the same class.

3. The method according to claim 1, wherein during computation of the distance between the banknote and the class known beforehand, it is checked whether the sum value has exceeded the value of the maximum allowable distance for the given class; in case it has, any further computation stops, and a conclusion is made that it is impossible for the banknote to belong to the given class.

4. The method according to claim 2, wherein during computation of the distance between the banknote and the class known beforehand, it is checked whether the sum value has exceeded the value of the maximum allowable distance for the given class; in case it has, any further computation stops, and a conclusion is made that it is impossible for the banknote to belong to the given class.

5. The method according to claim 1, wherein the banknote image signature is additionally found as a binary number by putting in correspondence each bit of a signature with a definite pair of areas;
   for each pair of areas the function values corresponding to these areas are compared, the value of each signature bit is set according to a logic result of comparison, and prior the distance between the banknote and the class in the feature space is found, a second distance to this class is additionally found;
   to get it, this class is represented by a class centroid signature known beforehand, by a masking bit pattern known beforehand and by the maximum allowable second distance to the centroid;
   to do so, the bits of the banknote signature are found that differ from the corresponding bits of the class centroid signature;
   the bits masked by a masking bit pattern are rejected;
   the second distance between the banknote and the given class is found by counting the number of differing bits that are not masked by the masking bit pattern, and the found distance is compared with the maximum allowable second distance to the given class;
   if the distance found exceeds the maximum allowable value, a conclusion is drawn that the banknote does not belong to the given class and the next known class is then considered.

6. The method according to claim 2, wherein the banknote image signature is additionally found as a binary number by putting in correspondence each bit of a signature with a definite pair of areas;
   for each pair of areas the function values corresponding to these areas are compared, the value of each signature bit is set according to a logic result of comparison, and prior the distance between the banknote and the class in the feature space is found, a second distance to this class is additionally found;

to get it, this class is represented by a class centroid signature known beforehand, by a masking bit pattern known beforehand and by the maximum allowable second distance to the centroid;

to do so, the bits of the banknote signature are found that differ from the corresponding bits of the class centroid signature;

the bits masked by a masking bit pattern are rejected;

the second distance between the banknote and the given class is found by counting the number of differing bits that are not masked by the masking bit pattern, and the found distance is compared with the maximum allowable second distance to the given class;

if the distance found exceeds the maximum allowable value, a conclusion is drawn that the banknote does not belong to the given class and the next known class is then considered.

7. The method according to claim 3, wherein the banknote image signature is additionally found as a binary number by putting in correspondence each bit of a signature with a definite pair of areas;

for each pair of areas the function values corresponding to these areas are compared, the value of each signature bit is set according to a logic result of comparison, and prior the distance between the banknote and the class in the feature space is found, a second distance to this class is additionally found;

to get it, this class is represented by a class centroid signature known beforehand, by a masking bit pattern known beforehand and by the maximum allowable second distance to the centroid;

to do so, the bits of the banknote signature are found that differ from the corresponding bits of the class centroid signature;

the bits masked by a masking bit pattern are rejected;

the second distance between the banknote and the given class is found by counting the number of differing bits that are not masked by the masking bit pattern, and the found distance is compared with the maximum allowable second distance to the given class;

if the distance found exceeds the maximum allowable value, a conclusion is drawn that the banknote does not belong to the given class and the next known class is then considered.

8. The method according to claim 4, wherein the banknote image signature is additionally found as a binary number by putting in correspondence each bit of a signature with a definite pair of areas;

for each pair of areas the function values corresponding to these areas are compared, the value of each signature bit is set according to a logic result of comparison, and prior the distance between the banknote and the class in the feature space is found, a second distance to this class is additionally found;

to get it, this class is represented by a class centroid signature known beforehand, by a masking bit pattern known beforehand and by the maximum allowable second distance to the centroid;

to do so, the bits of the banknote signature are found that differ from the corresponding bits of the class centroid signature;

the bits masked by a masking bit pattern are rejected;

the second distance between the banknote and the given class is found by counting the number of differing bits that are not masked by the masking bit pattern, and the found distance is compared with the maximum allowable second distance to the given class;

if the distance found exceeds the maximum allowable value, a conclusion is drawn that the banknote does not belong to the given class and the next known class is then considered.

9. The method according to claim 1, wherein after drawing a conclusion concerning possibility of the banknote membership in the known classes, in addition, a mutual comparison of the distances from the banknote to the classes the banknote may belong to is performed; the class the distance to which has a minimum value is found, and a conclusion is drawn about the banknote membership in the found class.

10. The method according to claim 2, wherein after drawing a conclusion concerning possibility of the banknote membership in the known classes, in addition, a mutual comparison of the distances from the banknote to the classes the banknote may belong to is performed; the class the distance to which has a minimum value is found, and a conclusion is drawn about the banknote membership in the found class.

11. The method according to claim 3, wherein after drawing a conclusion concerning possibility of the banknote membership in the known classes, in addition, a mutual comparison of the distances from the banknote to the classes the banknote may belong to is performed; the class the distance to which has a minimum value is found, and a conclusion is drawn about the banknote membership in the found class.

12. The method according to claim 4, wherein after drawing a conclusion concerning possibility of the banknote membership in the known classes, in addition, a mutual comparison of the distances from the banknote to the classes the banknote may belong to is performed; the class the distance to which has a minimum value is found, and a conclusion is drawn about the banknote membership in the found class.

13. The method according to claim 5, wherein after drawing a conclusion concerning possibility of the banknote membership in the known classes, in addition, a mutual comparison of the distances from the banknote to the classes the banknote may belong to is performed; the class the distance to which has a minimum value is found, and a conclusion is drawn about the banknote membership in the found class.

14. The method according to claim 6, wherein after drawing a conclusion concerning possibility of the banknote membership in the known classes, in addition, a mutual comparison of the distances from the banknote to the classes the banknote may belong to is performed; the class the distance to which has a minimum value is found, and a conclusion is drawn about the banknote membership in the found class.

15. The method according to claim 7, wherein after drawing a conclusion concerning possibility of the banknote membership in the known classes, in addition, a mutual comparison of the distances from the banknote to the classes the banknote may belong to is performed; the class the distance to which has a minimum value is found, and a conclusion is drawn about the banknote membership in the found class.

16. The method according to claim 8, wherein after drawing a conclusion concerning possibility of the banknote membership in the known classes, in addition, a mutual comparison of the distances from the banknote to the classes the banknote may belong to is performed; the class the distance to which has a minimum value is found, and a conclusion is drawn about the banknote membership in the found class.

17. A method of banknote classification wherein a banknote is scanned to obtain its two-dimensional image consisting of pixels; the obtained image is separated into areas in compliance with a specified partitioning scheme and the function for each area is computed with a definite algorithm in such a way that its value depends on the values of the pixels within the area;

a signature of the banknote image is found as a binary number by putting in correspondence each bit of the signature with a definite pair of areas;

for each pair of areas a plurality of function values corresponding to these areas are compared, a value of each signature bit is set according to a logic result of comparison;

the signature is compared with banknote classes known beforehand;

each class is represented as a centroid of the class known beforehand, a masking bit pattern known beforehand, and a maximum allowable distance to the centroid;

to do so, the bits of the banknote signature are found that differ from the corresponding bits of the class centroid, the bits masked by a masking bit pattern are rejected;

a distance between the banknote and the given class is found by counting the number of differing bits that are not masked by the masking bit pattern;

the distance found is compared with the maximum allowable distance to the given class; if the found distance does not exceed the maximum allowable one to the given class, a conclusion is drawn about possible membership of the banknote in the given class;

if the found distance exceeds the maximum allowable distance to the given class, a conclusion is drawn that the banknote does not belong to the given class.

18. The method according to claim 17, wherein the distance to the class is found by computing additionally a specified function whose arguments are a number of differing bits not masked by the masking bit pattern, and a number of the masking bits in the class masking bit pattern.

19. The method according to claim 17, wherein the pairs of areas are composed of areas having a common boundary.

20. The method according to claim 18, wherein the pairs of areas are composed of areas having a common boundary.

21. The method according to claim 7, wherein after drawing a conclusion concerning possibility of the banknote membership in the known classes, in addition, a mutual comparison of the distances from the banknote to the classes the banknote may belong to is performed; the class the distance to which has a minimum value is found, and a conclusion is drawn about the banknote membership in the found class.

22. The method according to claim 18, wherein after drawing a conclusion concerning possibility of the banknote membership in the known classes, in addition, a mutual comparison of the distances from the banknote to the classes the banknote may belong to is performed; the class the distance to which has a minimum value is found, and a conclusion is drawn about the banknote membership in the found class.

23. The method according to claim 19, wherein after drawing a conclusion concerning possibility of the banknote membership in the known classes, in addition, a mutual comparison of the distances from the banknote to the classes the banknote may belong to is performed; the class the distance to which has a minimum value is found, and a conclusion is drawn about the banknote membership in the found class.

24. The method according to claim 20, wherein after drawing a conclusion concerning possibility of the banknote membership in the known classes, in addition, a mutual comparison of the distances from the banknote to the classes the banknote may belong to is performed; the class the distance to which has a minimum value is found, and a conclusion is drawn about the banknote membership in the found class.

* * * * *